Oct. 3, 1933.　　　C. H. WAGNER　　　1,929,340
STICK LOADING APPARATUS FOR STICK CARRIERS
Filed July 28, 1932　　　3 Sheets-Sheet 3
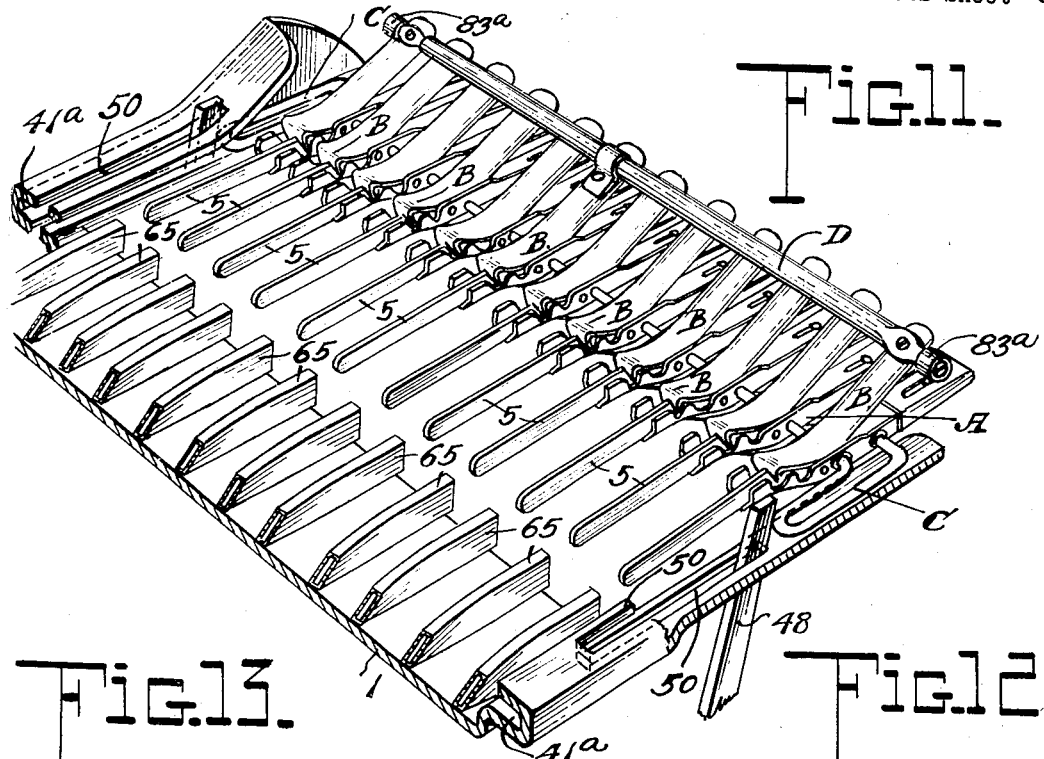
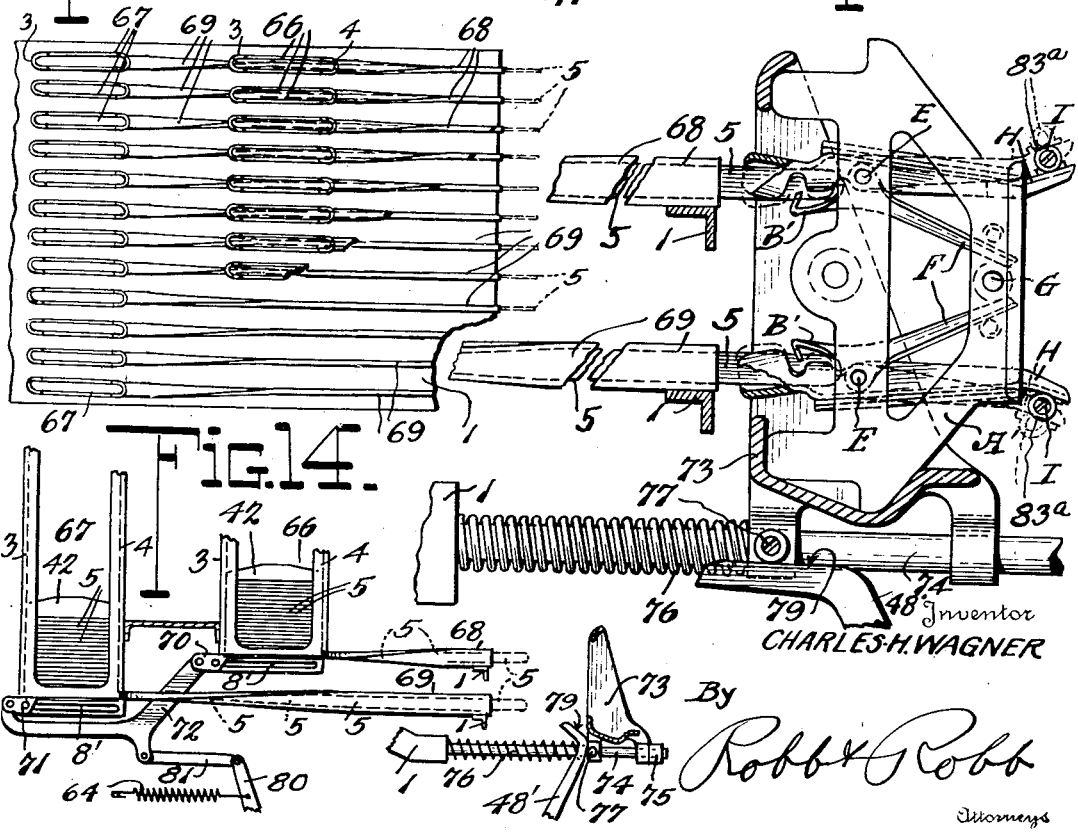

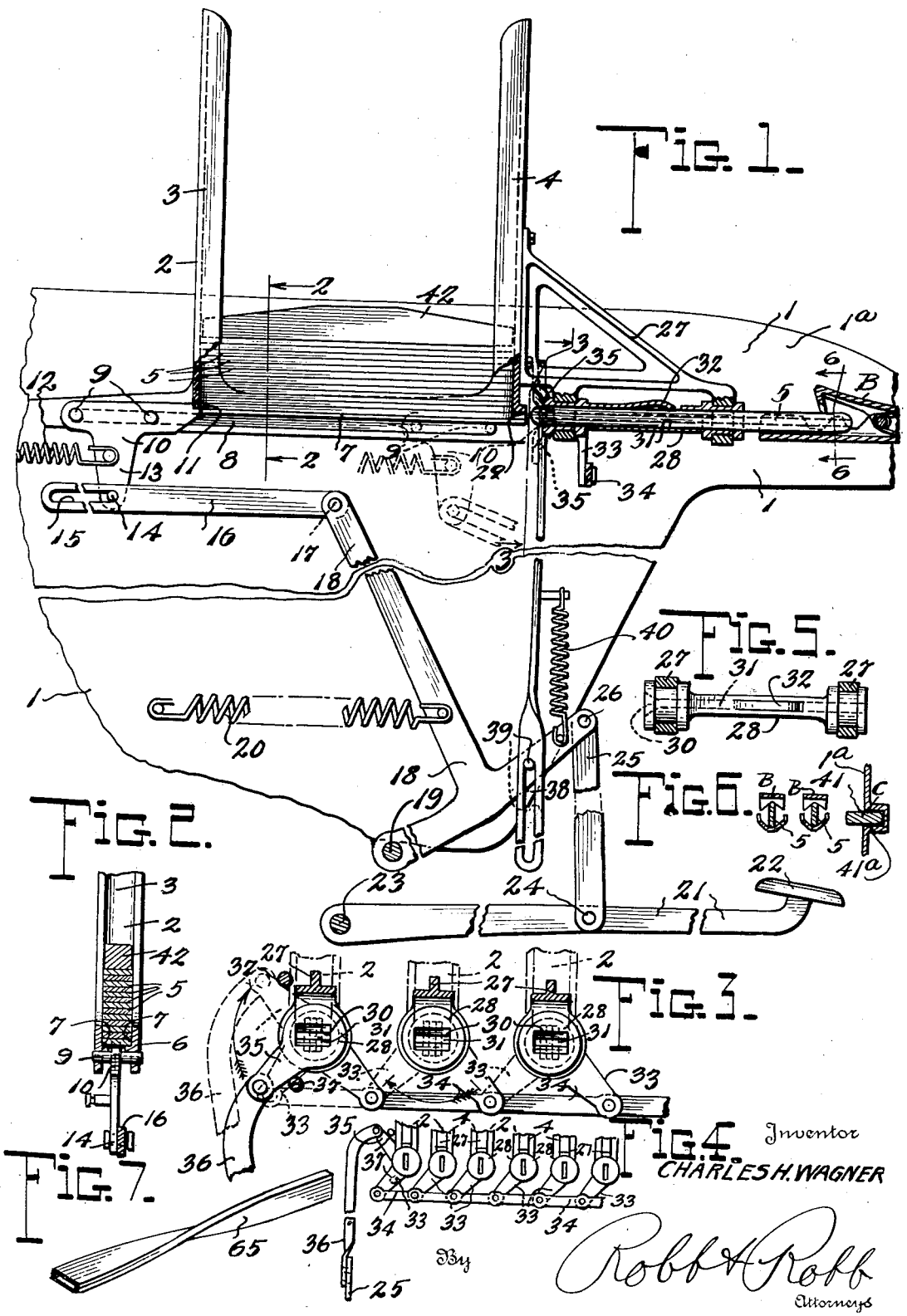

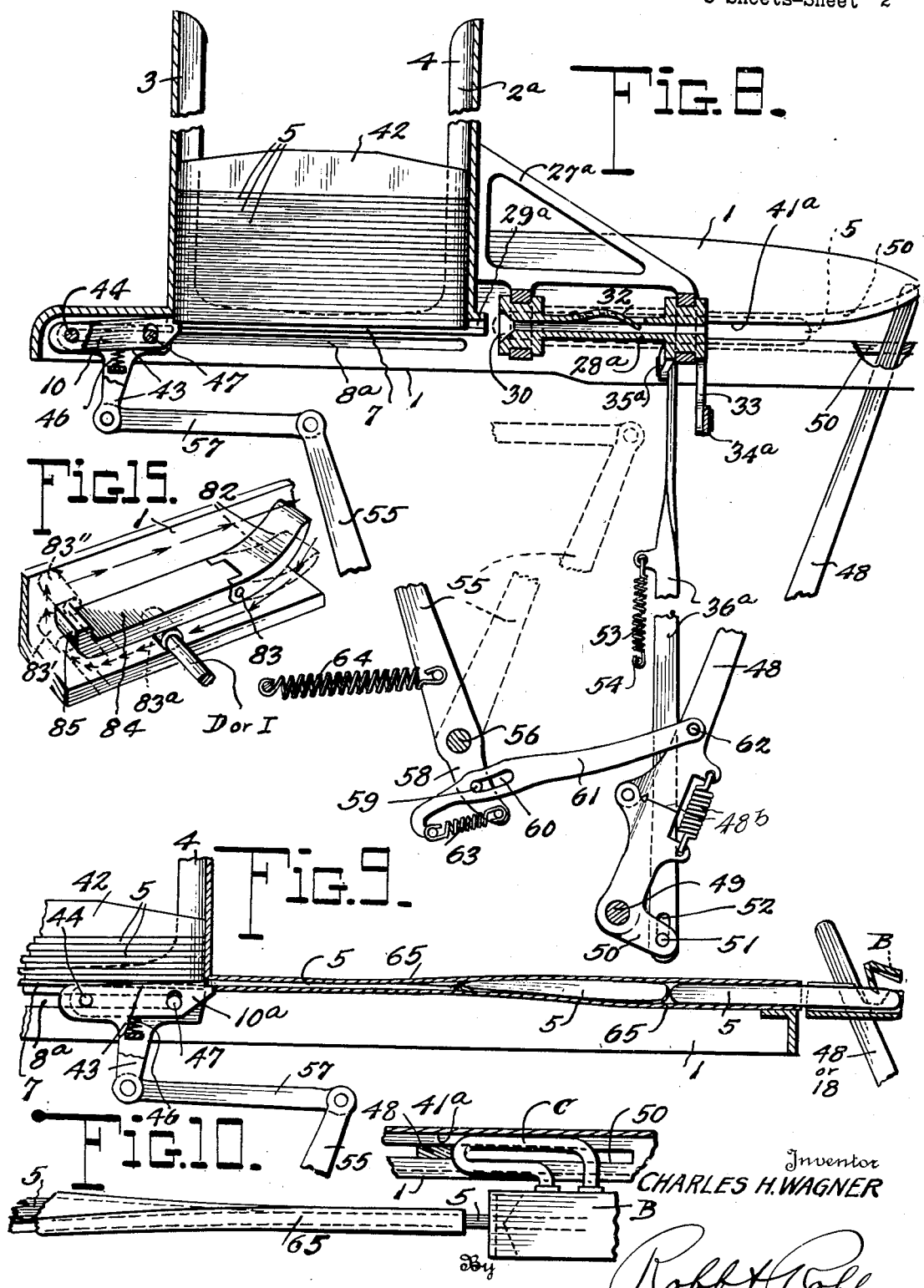

Patented Oct. 3, 1933

1,929,340

UNITED STATES PATENT OFFICE 1,929,340

STICK LOADING APPARATUS FOR STICK CARRIERS

Charles H. Wagner, Washington, D. C.

Application July 28, 1932. Serial No. 625,516

21 Claims. (Cl. 107—7)

This invention relates to apparatus for loading stick or handle carriers used in the manufacture of confections known as ice cream suckers. These suckers comprise a stick or handle member frozen in a body of edible material such as ice cream.

One method of manufacture of the above noted ice cream suckers consists of placing a plurality of sticks or handles in a stick carrier and then placing the carrier containing the sticks over a mold or pan having a plurality of compartments, one for each stick. The carrier positions the sticks centrally of the compartments, each of which is filled with the substance to be frozen. The mold is then placed in a brine tank until the material in the compartments is firmly frozen, causing the sticks to be firmly embedded therein. The mold is then heated to loosen the material therefrom after which the carrier is removed, carrying with it the sticks and the blocks of frozen material.

These carriers comprise a plurality of individual spring actuated stick holding clips with an actuating member to simultaneously open all the clips either for the insertion of the sticks therein, or for the removal of the completed sucker therefrom. The carriers are also extensible longitudinally so as to increase the space between the suckers after they have been removed from the freezing molds so that they may be more readily dipped in a coating composition such as chocolate, and also to support the suckers in spaced inverted position so that the bags may be more readily placed over them.

One example of these carriers is disclosed in the patent to R. F. Brimer, 1,809,190.

An object of my invention, is therefore, to provide a loading apparatus for the above described type of stick or handle carriers.

Another object is the provision of a loading apparatus for completely loading the above mentioned types of handle carriers for stick handles in a single operation.

Another object is the provision of a loading apparatus for carriers having a plurality of individual spring operated stick holding clip wherein means are provided for simultaneously inserting a stick into each of the clips so that the carrier may be completely loaded with sticks in a single operation.

A further object is the provision of a stick loading apparatus for loading the above mentioned carrier with means for preventing the insertion of less than the full number of sticks as determined by the capacity of the carrier.

A still further object is the provision of a stick loading apparatus comprising a plurality of stick magazines arranged to simultaneously project a stick in a horizontal plane and to rotate the stick on its longitudinal axis from a flat horizontal position to a vertical position to dispose the sticks for insertion in a stick carrier.

A still further object is the provision of a plurality of stick magazines arranged in closely spaced relation and ejectors associated with the bottom sticks arranged to be actuated by a stick carrier to insert the sticks into the carrier.

Another object is the provision of a loading apparatus for carriers of the class described for automatically opening the jaws of the carrier as it is moved on the guideway toward the loader and to cause the jaws to be closed to grip the sticks when removed from the loader.

A further object is the provision of a loader for stick carriers, in which flat sticks are placed in a horizontal position and an associated stick turning mechanism is arranged for rotating the sticks to dispose the flat sides thereof in vertical position together with means for moving the sticks into the turning mechanism.

Other and further objects and advantages of the invention will be hereinafter set forth and the novel features thereof defined by the appended claims.

In the drawings:—

Fig. 1 is an end elevation, parts thereof being broken away and shown in section, the dotted lines disclosing the operating pedal partly depressed to move the sticks into the rotary stick holders;

Fig. 2 is a vertical sectional view taken approximately on the line 2—2 of Fig. 1 but disclosing only one of the stick magazines;

Fig. 3 is a vertical sectional view on line 3—3 of Fig. 1 and disclosing the inner or receiving end of the rotatable stick holders, full lines indicating the receiving position and dotted lines their rotated position;

Fig. 4 is a somewhat diagrammatic fragmentary front elevation of a portion of my loader with the stick holders rotated to position the sticks for engagement with the jaws of a stick carrier;

Fig. 5 is a horizontal detail sectional view through one of the supporting brackets for the rotary stick holders;

Fig. 6 is a detail sectional view taken approximately on line 6—6 of Fig. 1 and disclosing the side guides for one form of stick carrier;

Fig. 7 is a detail perspective view of a modified form of stick rotating device consisting of a twisted flat tube;

Fig. 8 is a side elevation, parts being broken away and shown in section, of a further modification in which the loading apparatus is actuated by the carrier as the same is placed in position to receive the stick handles, the dotted lines showing the sticks in position to be received by the carrier;

Fig. 9 is a fragmentary vertical sectional view through a portion of the apparatus seen in Fig. 8 but disclosing the twisted tube type of stick rotating device;

Fig. 10 is a fragmentary horizontal detail view taken in the plane of the carrier grooves or guides but showing a portion of the twisted tube and end of carrier in elevation;

Fig. 11 is a detail perspective view of one form of stick carrier in position on the side guides of my loader and being withdrawn after loading;

Fig. 12 is a fragmentary side elevation of another form of carrier having two banks of stick clips, and disposed in position in the carriage of a further modified form of loading apparatus;

Fig. 13 is a top plan view of the arrangement of magazines and delivering tubes adaptable for use in conjunction with the carrier disclosed in Fig. 12;

Fig. 14 is a fragmentary side elevation of the modified form of loading apparatus shown in Figs. 12 and 13; and Fig. 15 is a detail perspective view of an automatic stick holding clip opening device.

Like reference characters designate corresponding parts in the several figures of the drawings, in which 1 indicates generally a supporting frame on which is mounted a plurality of stick magazines 2 placed side by side in closely spaced relation. These magazines 2 each comprise vertical U channels 3 and 4 for receiving a plurality of flat sticks 5 in horizontal super-imposed position as seen in the drawings.

The channels 2 are connected together by the flanged strips 6, the inwardly extending flanges 7 thereof constituting a support for the lowermost sticks in the magazines 2.

The strips or plates 6 extend downwardly below the flanges 7 and to the rear of the magazines 2 and are provided with the longitudinal grooves or slots 8 in which the carrier pins 9 of the ejectors 10 slide.

These ejectors each have a stick engaging shoulder 11 for engaging the rear ends of the sticks and they operate between the flanges 7, to move the lowermost stick out of the magazine 2.

Return springs 12 are connected between the ejectors 10 and a stationary part of the frame to return the ejectors to the position shown in full lines in Fig. 1.

The ejectors 10 each have a depending arm 13 carrying a pin 14 which is disposed in the slot 15 of the ejector operating link 16, the free end of which is pivoted at 17 to the operating bell crank 18 pivoted at 19 to the frame in a suitable manner. These bell cranks may all be fixed to a common operating shaft instead of the pivot 17, the shaft being journaled in the side frames of the machine if it is desired. The bell cranks are normally held in the full line position by the return spring, or springs 20.

An operating lever 21 having a foot pedal 22 is pivoted at 23 to the frame of the apparatus and has pivoted thereto at 24 the operating link 25. This link is in turn pivoted at 26 to the short arm of the bell crank 18.

The front channels 4 of each of the stick magazines 2 have secured thereto the rotary stick holder brackets 27 in which are journaled the rotary stick holders 28. These holders 28 are disposed directly in front of the stick discharge slots 29 in the lower portion of the channels 4 for discharging the lower stick in each magazine. They comprise a body having a flared stick-receiving opening 30 leading into a rectangular passage 31 extending through the body, the cross sectional shape which is the approximate shape of the sticks being handled but slightly larger. Detent springs 32 may be provided to frictionally hold the sticks in the passages if desired, and also to resist rearward movement of the sticks while in the holders.

Each of the holders is provided with an operating arm 33, these arms being connected together by the link, or links, 34 so that simultaneous rotation of all of the holders is accomplished.

One of the holders, preferably the end one is provided with a second arm 35 to which is pivoted the actuating link 36. This arm 35 operates between the stationary stop or limit pins 37 which limit the rotation of the holder to 90 degrees or a quarter of a turn. The lower end of the actuating link 36 is slotted at 38 to receive the holder actuating pin 39 carried by the short arm of the bell crank 18.

A tension spring 40 connects the bell crank arm with the actuating link 36 to normally hold the pin 39 against the upper end of the slot 38.

The side frames 1ª are provided with grooves or guide channels 41 for supporting and properly positioning the stick carriers in order that they will engage the sticks held by and protruding from the holders 28 as seen in Figs. 1 and 6.

The type of stick carrier most particularly adaptable for the above described apparatus is seen in Fig. 11 and comprises an expandable frame A which carries a group or plurality of spring actuated stick holding clips, B, the sides of the frame being provided with extensions C which are adapted to slide in the grooves or guide channels 41 aforesaid.

This carrier is somewhat similar to that disclosed in Patent 1,809,190 to R. F. Brimer, and will not therefore, be described in detail.

In operating the loader just described the operator picks up one of these stick carriers (as seen in Fig. 11) and places the same with the extension C in the side grooves 41 formed in the side 1ª of the apparatus.

The operating pedal or lever 21—22 is then fully depressed, rocking the bell crank 18 to the right. During the first portion of this movement the spring 40 will cause the holder actuating link to follow the short arm of the bell crank down which rotates the holders to position the "stick" receiving openings with their "width" in a horizontal plane, as seen in dotted lines in Fig. 1 and in full lines in Fig. 2. Also during this initial position of the operating lever 21, the links 16 are moved while the ejector 13 remains stationary due to friction of sticks in the magazines, and when the springs 12 are used, by these springs.

The holders now having been turned to stick receiving position, the actuating arm 35 thereof strikes the lower stop pin 37 preventing further downward movement of the link 36, the pin 39 will now move in the slot 38 as the bell crank 18 continues to move to the right. At this time the left hand ends of the slots 15 engage the pins 14 on the ejectors and further rocking of the bell crank 18 will cause the ejectors to move to the right sliding the lowermost sticks out of the magazines and into the stick holders 28.

The operator now removes the pressure from the operating member 22 permitting the return spring 20 to rock the bell crank 18 to the left. During the initial return movement the ejectors are caused to return to their full line position (Fig. 1) while the pin 39 on the short arm of the bell crank moves toward the upper end of the slot 39 in the actuating link 36 until this pin engages the end of the slot, whereupon the final movement of the bell crank causes the carriers to be rotated back a quarter of a turn to position the sticks therein with their flat sides in a vertical plane ready to be grasped by the clips of the carrier, as seen in full lines in Fig. 1.

The operator now depresses the operating bar C on the stick carrier to open all of the stick holding clips and slides the same inwardly toward the loader until the sticks slip into the open stick holding clips. The operating bar of the carrier is then released permitting the clips to grip the edges of the sticks after which the carrier is withdrawn fully loaded as seen in Fig. 11.

In order to facilitate the downward movement of the sticks in the magazine a weight member 42 is disposed on top of the sticks in each magazine, this weight having a contour similar to the sticks, but materially thicker. These weight members constituting locking or jamming devices when any of the magazines become empty. This is due to the engagement of the ejectors with the ends of the weights and the inability of the thicker weight members to pass through the stick discharge slots 29 in the front channels 4. Under these conditions there is no possibility of moving any sticks into the stick holders unless all of the magazines contain sticks.

Referring now to the modified form shown in Fig. 8 it should be observed that while the magazines $2^a$ and their associated stick holders $28^a$ and ejectors $10^a$ are quite similar to those shown and described in Figs. 1 to 6, the disclosure in this form of the invention is designed to be operated by the stick carrier as it is moved in the side guides $41^a$ toward the loader. The lever system is therefore a little different from the first form.

The ejector $10^a$ comprises a pair of spaced plates 43 between which is pivotally mounted at 44 the ejector proper 45 normally urged upwardly by the spring 46. The forward pin 47 as well as the pivot pin 44 operates in the guide slots $8^a$.

A pair of operating levers 48 secured to the operating shaft 49 extend upwardly through slots 50 in the side guide channels $41^a$ as seen in Figs. 8 and 11, to dispose the ends of the levers in the path of movement of the end extension on the carrier.

An arm 50 is secured to the shaft 49 having a pin 51 disposed in a slot 52 formed in the upwardly extending actuating link $36^a$. The upper end of the link $36^a$ is pivotally connected to the operating arm $35^a$ of one of the stick holders $28^a$. These holders all have arms $33^a$ connected together by the link $34^a$.

A spring 53 connects the link $36^a$ with the frame of the machine at 54 to normally exert downward pressure on the link and hold the holders $28^a$ in receiving position as shown in Fig. 8.

An ejector operating lever, 55, pivoted at 56 is connected to the ejector carriers 13 through the intermediate link 57.

The lever 55 extends past the pivot 56 to form an arm 58 which carries the pin 59 positioned in the slot 60 of the ejector actuating link 61 which link is pivoted at 62 to the operating lever 48. A spring 63 connects the end of the link 61 with the end of the arm 58 tending to maintain the left hand end of the slot 60 against the pin 59. A light return spring 64 is connected between the lever 55 and the frame of the machine.

The type of carrier particularly adaptable for this type of apparatus is similar to that as shown in Fig. 11 although other types may be readily loaded without a material modification of the structure as shown or claimed.

When it is desired to load a carrier, assuming that all of the magazines $2^a$ are loaded with the handle sticks, the operator grasps one of the carriers such as shown in Fig. 11 and places the side extensions C in the channels $41^a$, depresses the stick clip opening bar D and pushes the carrier toward the stick holders $28^a$.

The extensions C on the carrier will engage the levers 48 swinging them to the left causing the link or links 61 to swing the ejector actuating lever (or levers) 55 to the right to the dotted line position in Fig. 8 which causes the ejector $10^a$ to move the bottom stick through the opening $29^a$ into the holders $28^a$ which remain in receiving position during this preliminary movement due to the spring 53 and the pin and slot connections 51—52.

After the ejector carrier pins 47 reach the right hand ends of the slots $8^a$ the lever 55 cannot swing further, but by reason of the pin and slot connection 59—60 the link 61 and operating lever 48 are permitted to move further under influence of the side arm extensions C of the carrier.

At this time, however, the pin 51 has reached the upper end of the slot 52 so that further movement of the levers 48 will rotate the carriers $28^a$ to position the sticks with their flat sides vertical as seen in dotted lines, ready to be inserted in the carrier. Further movement of the carrier in the guides $41^a$ causes the sticks to slip into the spring clip B thereof.

The operator now releases the bar D permitting the clips B to close on the sticks and withdraws the carrier from the loader as seen in Fig. 11.

The levers 48 are sufficiently flexible to permit the final inward movement for inserting the sticks in the carriers after the holders have been turned although a spring hinge such as $48^b$ may be provided.

It should be observed that upon rotation of the stick holders the sticks cannot be pushed rearwardly since the ends thereof will strike the top wall of the openings $29^a$ due to the 90 degree turning movement of the sticks.

Figs. 9 and 10 disclosed a modified form of stick turning holder which comprises a twisted flat tube having a quarter twist intermediate its length so as to receive the sticks from the magazine with their flat faces horizontal and deliver the sticks at the other end with the flat faces in a vertical plane.

The interior or bore of the tube is similar in cross section to that of the sticks except sufficiently large to pass the sticks through without undue friction.

Since the twist of the tube is fixed, the length thereof will determine the degree of twisting action on the sticks, and this may be varied as desired but I have shown in Fig. 9 a tube which accommodates two and one-half sticks the outer extremity of the tube having very little or no twist since this must hold the stick "vertical" so that they will readily enter the clips B on the carrier.

The operating instrumentalities for this form of my invention are obviously the same as used in Fig. 1 or in Fig. 8 but it is also obvious that when the twisted tubes are used the levers 48 are directly connected through a link (similar to 61) to the lever 55 and all pin and slot connectors such as 59—61 are not necessary.

Fig. 11 discloses a loaded carrier being withdrawn from a loader employing the twisted tube form of stick turning holder.

Figs. 12 to 14 disclose another slight modification of my invention which also employs the twisted tube stick holders.

This form is adaptable for stick carriers of the type disclosed in Fig. 12, consisting of an extensible frame A' carrying two banks (usually of twelve each) of stick clamping clips B' mounted on the longitudinal telescopic bars E. One of the operating handles F of each clip rests against the longitudinal telescope bar G, while the other operating handles H of each group of clips is positioned under a telescopic bar I which is secured to the end clip handles H of each group.

In order to open this type of carrier to receive the sticks the operator places his finger on the upper bar I and his thumb under the lower bar I and squeezes them together (see full lines in Fig. 12). Springs are provided in each clip to force the handles F and H apart and grip the sticks when bars I are released.

Since there are two banks of clips to be loaded two sets of magazines 66—67 and associated twisted tubes 68—69 are used as seen in Figs. 12 to 14.

The ejectors 70—71 are connected together by the links 72 so as to be simultaneously operable.

A carrier supporting carriage 73 is slidably mounted on the fixed guide rods 74 and limited in its rearward movement by the stops 75. Compression springs 76 are interposed between the carriage and the frame 1 to exert outward pressure on the carriage.

The carriage 73 is provided with rollers 77 for actuating the operating levers 48' having their ends bent as at 79 so as to permit final inserting movement of the carrier without further actuating of the levers 48' if it is so desired.

The levers 80 are of the intermediate pivot type similar to 55 as shown in Fig. 8 and are pivoted at one end to a link (not shown) which link is in turn pivoted to the lever 48'—79.

The lever 80 is pivoted to a link 81 which link is pivoted to the selector connecting link 72.

In the operation of this form, the operator places the double gang stick carrier A' in the carriage 73, presses the two rods or bars I toward each other to open the stick receiving jaws B'. He then pushes the carrier toward the twisted tubes 68—69. The carriage operating on the guides 74 will insure proper alignment of the stick clips B' with the ends of the tubes.

As the carriage is moved inwardly the rollers 77 rock the levers 48' to the left which through the interconnecting link (not shown) between the lever 48' and the end of the lever 80 will rock the lever 80 to the right moving the ejectors 70—71 in their guides 8' to cause the lowermost sticks in the magazines 66 and 67 to be pushed into the twisted tubes 68—69. This forces one of the sticks contained in each tube out of the delivery end and into each of the spring clips on the carrier.

The operator now releases pressure on the bars I and moves the carrier and carriage away from the ends of the twisted tubes, withdrawing the sticks from the tubes, after which the carrier may be positioned on the molds with the sticks projecting into the individual filled compartments and the molds placed in the freezing tanks in the usual manner.

From the above it will be observed that a double bank carrier can be loaded with a single and very quickly carried out operation.

Under some circumstances it is desirable to provide camming means to automatically open the clips as the carrier is moved toward the loader and one method of carrying this out is disclosed in Fig. 15 in which a camming member 82 is pivoted at 83 to the side wall 1 of the apparatus to move downwardly as in dotted lines but resist upward movement beyond the full line position. There is one of these camming members located on each side of the machine in the path of the rollers 83ª which are affixed to the ends of the operating bars D (or I when the double type carrier is used).

As the carrier is pushed into the machine the camming members exert downward pressure on the bars D or I through the rollers 83ª causing the clips B to be opened. The rollers now pass under the holding flanges 84 at which time the sticks enter the carrier clips B.

As the carrier is moved to fully insert the sticks therein the rollers escape at the ends 85 of the holding flanges 84 releasing the stick holding clips and spring upwardly thus clamping the sticks in the carrier. (See dotted positions marked 83'—83'' in Fig. 15.)

As the carrier is now withdrawn the roller cams the cam 82 downwardly out of its path after which it springs up again in the position as shown under the influence of a spring (not shown).

While the specific details of construction have been herein shown and described, the invention is not confined thereto as changes and alterations may be made without departing from the spirit thereof as defined by the appended claims.

Having thus described my invention what I claim as new and desire to secure by Letters Patent is:

1. In a loader for stick carriers of the class described, a stick magazine, an ejector therefor, and a stick holder having means to receive the sticks ejected from the magazine to rotate the said sticks less than a full turn and position them for engagement with the stick carrier.

2. In a stick loader for carriers of the class described, a stick magazine, means for ejecting sticks from the magazine, and an associated stick turning holder for receiving the sticks ejected from the magazine, rotating said sticks a quarter turn and supporting them with a portion thereof extending beyond the end of the holder for engagement with the stick gripping member of a carrier.

3. In a loader of the class described, a plurality of closely spaced flat stick magazines for supporting the bottom sticks in the same plane, feeding means for simultaneously feeding the bottom stick out of each of the magazines and for disposing their flat faces in another plane and lock means operable incident to the emptying of a magazine to prevent the operation of the stick feeding means aforesaid.

4. In a loader for carriers of the class described, a vertical magazine for supporting flat sticks in superimposed position, and means for ejecting and rotating the bottom sticks to dispose the flat sides thereof in a vertical plane.

5. In a loader for stick carriers used in the manufacture of frozen confections on handles, a plurality of stick magazines for supporting flat sticks in stacked position, associated stick holders for receiving sticks from the magazines and rotating them to dispose the flat sides of the sticks in vertical planes, associated guide means to receive the carrier and dispose the same with its stick gripping clips adjacent the ends of the holders and means operable by the carrier for inserting sticks from the magazines into the holders and for rotating the holders.

6. In a stick loader for flat sticks, a bank of magazines for supporting flat sticks in one plane, ejector means for ejecting sticks from the magazines and positioning them in another plane in parallel spaced relation for insertion in a stick carrier having a plurality of individual stick holding devices.

7. In a flat stick loader for stick carriers of the class described, a support, a plurality of magazines on said support for supporting the sticks in stacked relation, stick carrier guide means for guiding a stick carrier into cooperative relation with said stick magazines and means for ejecting sticks from said magazines, rotating said sticks on their longitudinal axis approximately a quarter turn and supporting them in protruding position to be inserted in the carrier when the same is positioned in said guiding means and advanced toward the said magazines.

8. In a stick loader for ice cream sucker stick carriers in which a plurality of stick gripping jaws are arranged in spaced relation, stick holding means arranged to hold sticks for insertion in the gripping jaws of the carrier, guide means for the carrier to position the jaws of the carrier to receive the sticks, and automatic means operable incident to relative movement of the carrier toward the loader to open the jaws of the carrier for the reception of the sticks therein.

9. In a loader for carriers of the class described, a vertical flat stick magazine having spaced supporting means for supporting the lowermost stick in a horizontal position, a discharge opening in one end of the magazine, ejector means engageable with the end of the stick, means for moving the ejector while in engagement with the stick toward the discharge opening to discharge the stick through the opening, stick receiving means to receive said sticks and to dispose the sticks with their flat sides in another plane and weight means disposed on the sticks in the magazine, said weight means being movable between the stick ejector and a part of the magazine when said magazine becomes empty to prevent movement of the ejector.

10. In a loader for inserting flat sticks in carriers of the class described, spaced vertical stick magazines for holding flat sticks in stacked relation, ejector means for simultaneously ejecting the lower stick from each magazine, stick holding means for receiving the sticks when ejected from the magazine and positioning them for insertion in a carrier, carrier guide means arranged adjacent the holders to position the carrier for loading thereof by the stick holders, and locking means for said ejector means arranged to be rendered inoperable by the sticks in the magazine.

11. In a stick loader of the class described, a support, a plurality of stick magazines carried thereby, stick turning holders associated with the magazines to receive sticks therefrom rotate them less than a complete turn and hold them with a portion protruding from the holder, ejector means for moving the sticks from the magazines, and means for actuating the ejector means.

12. In a stick loader of the class described, a plurality of stick magazines, rotary stick holders associated with the magazines to receive sticks therefrom and hold them with a portion thereof protruding from the holder, ejector means for moving the sticks into the holders, and means for actuating the ejectors and rotating the stick holders.

13. In combination with a stick carrier having a plurality of stick holding jaws disposed in predetermined spaced relation and having means to open the jaws to receive sticks therein, and for closing them to grip sticks when inserted therein, of a loader having guide means for receiving the carrier and including stick holders arranged in alignment with the jaws of the carrier when the same is positioned in the guide means, means operable by the carrier upon movement thereof toward the holders to position sticks in the holders with a part thereof projecting into the jaws of the carrier whereby withdrawal of the carrier from the guides will withdraw the sticks carried thereby from the stick holders.

14. In a loader of the class described, a support, spaced vertical stick magazines on said support including front and rear spaced stick receiving channels for supporting a stack of flat sticks in stacked relation, means for ejecting sticks from the magazines and disposing them in predetermined horizontally spaced relation with their flat sides vertical, a carrier having stick gripping jaws spaced apart a distance equal to the horizontal spaced relation of the sticks when ejected from the magazine, guide means for slidably supporting the carrier on the frame and means for simultaneously opening the jaws of the carrier as it is advanced toward the sticks in the loader.

15. In a stick loading apparatus for carriers of the class described, a stick magazine for holding a plurality of sticks having an oblong cross section, ejector means for discharging sticks from the magazine, and a twisted tubular member for receiving the ejected sticks and rotating them to position the flat sides thereof in another plane.

16. In a loading apparatus for carries of the class described, a twisted stick feeding tube, means for feeding sticks into said tube to rotate them thereby, and guide means for positioning a carrier adjacent the discharge ends of the tubes to receive sticks therefrom.

17. In a stick loading apparatus, a plurality of twisted flat tubes, stick feeding means for feeding flat sticks through said tubes, and positioning them with a portion thereof extending beyond the tube with the flat sides in vertical planes, operating means for the feeding means disposed for actuation by a carrier and guide means for causing the carrier to actuate the operating means and engage the sticks carried by the tubes.

18. In a stick loading apparatus of the class described, a support, a movable carriage carried thereby having carrier supporting means thereon to support a carrier having a plurality of gangs or groups of stick gripping devices, a plurality of groups of stick magazines having their bases in different planes, a plurality of groups of twisted stick feeding tubes, one tube being provided for each magazine, the ends of the tubes being disposed to deliver sticks into the stick gripping devices of a carrier when placed on the supporting means, upon relative movement thereof toward the twisted tubes, and means for moving sticks through the tubes.

19. In a loader for carriers of the class described, a plurality of vertical flat stick magazines, ejector means for ejecting sticks out of the magazines, twisted tubes for receiving the sticks ejected from the magazines, said tubes having a quarter twist to rotate the sticks a quarter of a revolution, said tubes being of such a length to cause a portion of the stick inserted therein to protrude therefrom.

20. In a loader of the class described, a frame, a carrier support movable thereon, a plurality of magazines for accommodating flat sticks, ejector means for ejecting sticks from the magazines, twisted tubes having a bore of substantially the shape of the sticks being handled therethrough, and also having a quarter twist to dispose the ends of the sticks in the planes of the stick holding members of a carrier, when it is positioned on the movable support, said tubes being of such a length to cause a portion of the stick inserted therein to project therefrom for entry into the carrier, and means operable by the movable support for actuating the ejector means.

21. In a loader for ice cream sucker manufacturing stick carriers having flat stick receiving and supporting means, a support, a plurality of flat stick magazines, means for ejecting the lowermost stick from each of the magazines, elongated guide means shaped to receive the sticks from the magazines and support the sticks with a portion thereof extending beyond the extremity of said guide means, said guide means engaging the sticks to positively support said sticks against rotation when so extended with the flat sides thereof in a predetermined plane for engagement with the receiving and supporting means of the carrier, and carrier positioning means cooperatively associated with loader guide means for positioning the carrier in stick receiving position with respect to the sticks carried by the guide means.

CHARLES H. WAGNER.